United States Patent [19]

Ueno et al.

[11] 3,716,381
[45] Feb. 13, 1973

[54] METHOD OF PRESERVING MEAT AND FISH WITH A GRANULAR SORBIC ACID FOOD PRESERVATIVE

[75] Inventors: Ryuzo Ueno, Nishinomiya; Tetsuya Miyazaki, Itami; Shigeo Inamine, Nishinomiya, all of Japan

[73] Assignee: Ueno Pharmaceutical Co., Ltd., Higashi-ku, Osaka, Japan

[22] Filed: Aug. 14, 1970

[21] Appl. No.: 63,913

Related U.S. Application Data

[63] Continuation-in-part of Ser. No. 714,454, March 20, 1968, abandoned.

[30] Foreign Application Priority Data

March 27, 1967 Japan ..............................42/18677

[52] U.S. Cl. ...................99/157, 99/107, 99/111, 99/158
[51] Int. Cl. ..........................A23b 1/00, A23b 3/00
[58] Field of Search........99/107, 108, 109, 111, 157, 99/158, 222, 224, 169

[56] References Cited

UNITED STATES PATENTS

| | | | |
|---|---|---|---|
| 2,997,394 | 8/1961 | Melnick et al. | 99/224 X |
| 3,065,080 | 11/1962 | Melnick et al. | 99/224 X |
| 3,065,084 | 11/1962 | Melnick et al. | 99/157 X |

*Primary Examiner*—Hyman Lord
*Attorney*—Sherman and Shalloway

[57] ABSTRACT

A method of preserving meat and fish products subjected to heat treatment in a final finishing which comprises adding to the raw meat or fish a granular preservative comprising sorbic acid powder particles whose surface has been coated with a hardened oil, said preservative being prepared by the steps comprising melting a hardened oil having a melting temperature of 40°–90° C., adding to said melted hardened oil maintained at a temperature not exceeding 90° C., sorbic acid powder in an amount of 1/10 to ½ of the weight of said hardened oil, dispersing the sorbic acid powder uniformly in the melted hardened oil at said temperature, and thereafter cooling the melted mixture by spraying it.

12 Claims, No Drawings

METHOD OF PRESERVING MEAT AND FISH WITH A GRANULAR SORBIC ACID FOOD PRESERVATIVE

This application is a continuation-in-part of copending application Ser. No. 714,454, filed Mar. 20, 1968 now abandoned.

The present invention relates to a method of preserving meat and fish products; more specifically, the present invention relates to such a method wherein a granular preservative is added to raw fish or meat subjected to heat treatment in a final finishing, the preservative coated with a hardened oil to ensure that the sorbic acid as a preservative compound does not come into contact with other materials at room temperature but makes such contact only upon being heated.

In general, the propagation of putrefying bacteria in foods is active under neutral or alkaline conditions and is inhibited under acid conditions. Accordingly, the preservability of foods is greatly enhanced by lowering its pH. In this sense, sorbic acid, which is known as being an acid preservative compound, can be regarded generally as being appropriate and worthy as a food preservative. However, food preservatives are usually added during the steps of manufacturing the foods rather that to the finished food products. In such case, it frequently happens that the preservative added becomes a hindrance to the manufacturing process.

Namely, in the production of meat products such as sausage and ham or fish products such as fish sausage and boiled fish paste (kamaboko), the minced meat is preferably maintained at a pH of about neutral, since adverse effects are produced on the elasticity of the product if the acidity is increased. For example, in the case of sausage, the pH of the minced meat is suitably in a range 5.8–6.2. When the pH becomes lower than this, while good effects are produced on the development of the color of the meat, the water retainability of protein declines, with the consequence that adverse effects appear with respect to the structural formation of the sausage. Accordingly, it is obviously a disadvantage to add sorbic acid as a preservative to a sausage emulsion.

With reference to use of sorbic acid as a food preservative, the following has been known:

1. Sorbic acid can be used as preservative for meat products (note, for example, U.S. Pat. No. 2,933,399).
2. The preservative effect of sorbic acid is higher as the pH of the food product is lower. Thus, in food preservatives of an organic acid type such as sorbic acid, the preservative action is associated with a non-dissociating molecule. Accordingly, as the pH is lower, the number of non-dissociating molecules increases and, therefore, the preservative effect is increased. Sorbates obtained by neutralization of sorbic acid with an alkaline substance, such as potassium sorbate and sodium sorbate, exhibit a lower preservative effect than sorbic acid per se, because such salts are alkaline or neutral while sorbic acid is acidic.

In the production of meat products the following is known:

3. The lowering of the pH of raw meat gives adverse effects to its water-retaining property, and the use of raw meat having a low water-retaining property results in a product of poor quality.

The above points (2) and (3) are contrary to each other and it is difficult to obtain products which are sufficient with reference to each of above matters (2) and (3). Accordingly, methods of preservation of meat products have been adopted with sorbic acid or salts thereof using free sorbic acid with the idea of achieving a high preservative effect while sacrificing the water-retaining property of the product; using a sorbic acid salt with the idea of attaining a product excellent in water-retaining property while sacrificing the preservative effect of sorbic acid; or using a mixture of sorbic acid and its salt at a suitable ratio while sacrificing both water-retaining property and preservative effect to some extent.

Accordingly, industry has long sought a method of preserving meat and fish which will eliminate the foregoing disadvantages associated with previous methods of preservation.

In accordance with the present invention research has been conducted on the relationship between the pH of raw meat and the water-retaining property of the product. It has been found that although the lowering of the pH of raw meat results in a decrease in the water-retaining property of raw meat and accordingly a lowering of the quality of a product prepared from such raw meat, the lowering of the pH barely yields any adverse effects in the quality of the product if the lowering of the pH is effected after thermal denaturation of the raw meat. Based on the above finding, a method has been developed which can provide meat or fish products satisfactory in both (2) and (3) above, wherein elution of sorbic acid is prevented in raw meat maintained at room temperature and sorbic acid is gradually eluted in the raw meat during a subsequent heating step.

Accordingly it is a principal object of the present invention to provide a method of preserving meat and fish products subjected to heat treatment at final finishing, which method eliminates the inherent disadvantages of previously employed methods of preservation.

It is a further object of the present invention to provide such a method of preserving meat and fish products wherein such method retains the high preservative action of sorbic acid while in no way adversely effecting the water-retaining properties of the product.

It is yet a further object of the present invention to provide such a process wherein a granular form of sorbic acid coated with a hardened oil having a melting point within the range of 40° to 90° C. whereby the sorbic acid is gradually eluted in the raw meat or fish during a heat finishing step but is not eluted in the raw meat or fish at room temperature.

Still further objects and advantages of the present invention are achieved by a process which comprises adding to a raw meat or fish product during processing, wherein the meat or fish is to be later subjected to a heat treatment during final finishing, a granular preservative comprising sorbic acid particles, the surfaces of which are coated with a hardened oil having a melting point of from 40° to 90° C.

The meat and fish preservative employed in the process of the present invention can be obtained, for example, by melting a hardened oil, adding and dispersing thoroughly therein a fine powder of sorbic acid, and thereafter spraying the melted mixture in a low temperature chamber, thereby obtaining the fine powder particles of sorbic acid as granules of 10–1,000 micron, the same being coated with the hardened oil. In producing the preservative in this manner, utmost care must be exercised in the management of the temperature for the following reasons. If, in dispersing the sorbic acid in the melted hardened oil, the temperature of the melted mixture exceeds 90° C., The sorbic acid starts to dissolve in the hardened oil and upon reaching a temperature of 120° C. it becomes completely dissolved. When a melt in this state is sprayed, a part of the sorbic acid sublimes in the spraying chamber and a satisfactory product cannot be obtained. Further, if the temperature of the melt exceeds 90° C., the composition of hardened oil-sorbic acid mixture changes as a result of the sublimation of the sorbic acid. Accordingly, the temperature of the melt must be maintained at below 90° C. and it is especially preferred that it be adjusted to be within the range of 70°–85° C. Again, if the temperature fluctuates, the sorbic acid particles dispersed in the hardened oil grow and a good product cannot be obtained. Therefore, fluctuation of the temperature must be avoided as much as possible after the sorbic acid has been dispersed.

The hardened oil used must be one whose melting temperature (M.T.) is within the range of 40°–90° C. Since a hardened oil whose melting temperature is less than 40° C., melts at room temperature, the use of such an oil runs counter to the objects of this invention. On the other hand, when a hardened oil whose melting temperature exceeds 90° C. is used, the hereinbefore noted inconveniences occur. Examples of the hardened oils suitable for use include hardened rape oil (M.T. 60°–63 C.), hardened castor oil (M.T. 80°–85° C.), hardened beef tallow (M.T. 54°–60° C.), hardened whale oil (M.T. 50°–52° C.) etc. The hardened oil is used in an amount sufficient to coat the surface of the sorbic acid powder particles. The amount usually used is at least two times by weight based on the sorbic acid. There is no particular upper limit on the amount of the hardened oil used as long as no adverse effects are had on the food products by the use of excess hardened oil. However, it is customary to use an amount up to ten times that of the sorbic acid on a weight basis. A convenient amount is that ranging from 3 to 5 times by weight based on the sorbic acid.

Further, if necessary, a small amount (e.g., 2–10 percent by weight based on the hardened oil) of a surfactant for food use, for example, glycerol monostearate, acetylated monoglyceride, etc., can be used along with the hardened oil. As these surfactants promote the uniform dispersion of the hardened oil in the food materials, there is the advantage that their use produces a uniform distribution of the sorbic acid in the resulting food product.

Since the granular food preservative used in the process of the present invention comprises particles whose surface is composed of a hardened oil having a melting temperature 40°–90° C., the hardened oil does not melt even though the preservative is added to the meat or fish emulsion during the process of producing meat and fish products, and accordingly the sorbic acid does not make contact with the minced meat, fish etc. It is only when in the final finishing step of the meat or fish products that they are heated at a higher temperature than the melting temperature of the hardened oil that the hardened oil coating of the particle surface melts to permit for the first time the contact of the sorbic acid of the particle interior with the meat or fish whereupon the action, as a preservative, of the sorbic acid begins to operate.

Accordingly, through the above procedure it has been discovered that it is possible to provide the preservative action of sorbic acid while eliminating any tendency toward a decrease in the water-retaining properties of the product.

The following non-limitative examples are presented for further illustration the present invention. Examples 1–4 illustrate the preparation of the granular preservative used in the process of the present invention, while Examples 5–7 illustrate the preservative process itself.

EXAMPLE 1

A homogenizer was used and one kg of sorbic acid powder comminuted to particle diameters of below 20 micron was added and thoroughly dispersed in a melt obtained by heating and melting 3.8 kg of hardened beef tallow (M.T. 60° C.) and 0.2 kg of distilled glycerol monostearate. The temperature of the melt was maintained at 70° C. during this time. This melted mixture was cooled by being sprayed into a chamber whose temperature was adjusted at 30°–35° C., using a rotary dish type sprayer. As a result, a granular preservative of particle diameters 50–300 microns comprising sorbic acid powder particles coated with the aforesaid hardened oil was obtained.

EXAMPLE 2

A homogenizer was used and one kg of sorbic acid powder comminuted to particle diameters below 20 microns was added and thoroughly dispersed in a melt obtained by heating and melting 3.8 kg of hardened rape oil (M.T. 63° C.) and 0.2 kg of acetylated monoglyceride. The temperature of the melt was maintained at 70° C. during this time. This melted mixture was cooled by being sprayed into a chamber whose temperature was adjusted at 30°–35° C., using a rotary dish type sprayer. As a result, a granular preservative of particle diameters 30–400 microns and of the same constitution as in Example 1 was obtained.

EXAMPLE 3

A homogenizer was used and one kg of sorbic acid powder comminuted to particle diameters below 20 microns was added and thoroughly dispersed in a melt obtained by heating and melting 4 kg of hardened rape oil (M.T. 63° C.), the temperature of the melt being maintained at 70° C. during this operation. When this melted mixture was cooled by being sprayed into a chamber whose temperature is adjusted at 25°–30° C., using a rotary dish type sprayer, a granular preservative of particle diameters 30–250 microns and of the same constitution as in Example 1 was obtained.

EXAMPLE 4

A homogenizer was used and one kg of sorbic acid powder comminuted to particle diameters below 20 microns was added and thoroughly dispersed in a melt obtained by heating and melting 2 kg of hardened rape oil (M.T. 63° C.) and one kg of hardened beef tallow (M.T. 60° C.), the temperature of the melt being maintained at 70° C. during this operation. When this melted mixture was cooled by being sprayed into a chamber whose temperature was adjusted at 30°–35° C., using a rotary dish type sprayer, a granular preservative of particle diameters 50–300 microns and of the same constitution as in Example 1 was obtained.

EXAMPLE 5

After adding 24 grams of common salt to 660 grams of starting material fish flesh for preparing boiled fish paste, the material was ground for 30 minutes. This was followed by the addition of 21 grams of sugar, 60 grams of starch and a preservative indicated in Table I. Then after adding 120 ml of water, the material was ground for 10 minutes. The material was than molded on baseboards and steamed for 20 minutes to thereby obtain the finished product. As the preservatives, 1.77 grams of sorbic acid, 2.37 grams (1.77 grams as calculated in terms of sorbic acid) of potassium sorbate, and 8.85 grams (1.77 grams as calculated in terms of sorbic acid) of the coated preservative obtained in Example 1 were used. The test results using these preservatives along with the results obtained using no preservative are shown in Table I.

TABLE II

| Preservative | Amount added of preservative based on material meat (wt.%) | pH Before heating | pH After heating | Quality of product | Preservative test |
|---|---|---|---|---|---|
| preservative of Example 2 | 1.0 * | 6.20 | 5.85 | soft and elastic jelly(good) | spoiled after 96 hours |
| sorbic acid | 0.2 | 5.82 | 5.90 | hard and easily broken jelly (unsatisfactory) | spoiled after 96 hours |
| potassium sorbate | 0.27 * | 6.40 | 6.45 | soft and elastic jelly(good) | spoiled after 96 hours |
| Not added | | 6.35 | 6.40 | soft and elastic jelly(good) | spoiled after 48 hours |

* 9.2 wt. % as calculated in terms of sorbic acid.

As can be seen from the results presented in the foregoing table, the preservative used in accordance with the present invention, as well as potassium sorbate, does not affect the quality of the product at all. The preservative of Example 2 also demonstrated a re-

TABLE I

| Preservative | pH before addition of preservative* | pH after addition of preservative* | pH after heating* | Quality of product** | Preservative effect*** |
|---|---|---|---|---|---|
| Not added | 6.84 | | 7.05 | Good | Spoiled after 36 hours. |
| Sorbic acid | 6.85 | 5.90 | 6.28 | Inelastic and easily broken | Spoiled after 72 hours. |
| Potassium sorbate | 6.86 | 6.88 | 7.08 | Good | Spoiled after 42 hours. |
| Preservative of Example 1 | 6.85 | 6.74 | 6.30 | do | Spoiled after 72 hours. |

*pH measurement: Ten grams of the specimen were suspended in 50 ml. of distilled water and measured with a glass electrode pH meter.
**Quality of product: The specimen was actually eaten and a sensory evaluation was made.
***Preservative test: The specimen was preserved in a constant temperature-constant humidity apparatus of 25° C. and RH 85%, and observations were made of the appearance of slime and mold, the time indicated being that at which the specimen became unfit to be eaten.

EXAMPLE 6

Meat for Vienna sausage comprising 1,000 grams (40%) of pork, 700 grams (28%) of fat pork and 800 grams (32%) of lean beef was cured for 24 hours, then passed through a chopper and thereafter kneaded for a while using a silent cutter. To this mixture were then added such auxiliary materials as condiments and spices along the with a preservative indicated in Table II, below, following which the mixture was kneaded for a further 6 minutes The kneaded meat was stuffed into a water-washed sheep intestine, dried for 60 minutes at 40° C., smoked for 30 minutes at 50° C., and then boiled for 10 minutes at a temperature of 70° C. in the center. After the preparation of the sausage was completed, it is stored in a refrigerator for about 20 hours and thereafter allowed to stand in a constant temperature-constant humidity apparatus at a temperature 25° C. and RH 85%.

The results of the tests conducted with respect to the pH, product quality and preservative effect are shown in Table II. The tests were carried out as in Example 5.

markable preservative effect which was comparable to that of sorbic acid. Namely, the shortcoming of sorbic acid, i.e., that it has adverse effects on the quality of the product, i.e., water-retaining property is eliminated in accordance with the present invention.

EXAMPLE 7

A fish sausage mixture consisting of 25 wt. percent of dressed tuna meat, 25 wt. percent of red whale meat (which had been treated by removal of its blood in a stream of running water, mixing in of a curing salts (sodium nitrite, sodium ascorbate, nicotinamide) and curing for 48 hours), 15 wt. percent of minced frozen pollack, 15 wt. percent squid, 10 wt. percent of Irish potato starch, 5 wt. percent of lard, and 5 wt. percent of seasoning and spices was kneaded for while with a silent cutter, following which the preservative to be tested was added and the kneading was carried out for a further 5 minutes. The product produced was then filled in a vinylidene chloride casing (3 cm in diameter) and pasteurized by heating for 60 minutes with hot water at 85° C.

As the preservative, 0.2 wt. percent (as calculated in terms of sorbic acid of either the preservative of Example 4, sorbic acid, or potassium sorbate and 0.002 wt. percent of 2-(2-furyl)-3-(5-nitro 2-furyl) acrylamide were conjointly used.

The results of the experiment are shown in Table III. The measurement of the pH was carried out as in Example 5.

TABLE III

| Preservative | pH Before heating and sterilization | pH After heating and sterilization | Quality of product | Preservative test 38°C. |
|---|---|---|---|---|
| preservative of Example 4 | 6.00 | 5.45 | Good product having elasticity. | Did not spoil for more than 40 days. * |
| sorbic acid | 5.20 | 5.42 | Easily breakable product not having elasticity. | do * |
| potassium sorbate | 6.09 | 6.22 | Good product having elasticity. | Spoiled on the 21st day. |
| not added | 6.06 | 6.20 | do | Spoiled on the 5th day. |

* When allowed to stand for more than 40 days at 38°C., there was observed a loss of color, and the product deteriorated in ways other than spoilage.

As is apparent from the results presented in the foregoing table, while sorbic acid has an adverse effect on the quality of the product, the preservative used in accordance with the present invention does not have an adverse effect on the quality of the product, which results from the fact that sorbic acid is coated with a hardened oil. In addition, a product is provided whose storage life is much greater than that of either the case where sorbic acid has been used or the case where a preservative has not been added.

As can be seen from the foregoing examples, sorbic acid, which could not be used heretofore for the preservative of such food products as, for example, processed meat and fish products, while being known as being an excellent preservative for such food can now demonstrate its inherent preservative ability to the maximum by means of the process of the present invention comprising adding to the raw meat or fish during processing a sorbic acid powder which has been coated with a hardened oil.

While the present invention has been described primarily with regard to the foregoing exemplification it should be understood that the present invention is not in any way to be deemed as limited thereto but must be construed as broadly as all or any equivalents thereof.

We claim:

1. A method of preserving meat or fish products which are subjected to a heat treatment in the final finishing step and which have their water-retention property degraded and preservability enhanced by lowering the pH of the meat or fish product, which method comprises adding to the raw meat or fish product during the production thereof a granular preservative comprising particles of sorbic acid powder, the surfaces of which are coated with a hardened oil having a melting temperature within the range of 40°–90° C., said hardened oil being employed in an amount of at least 2 times by weight of the sorbic acid powder, whereby the sorbic acid is not released in the meat or fish product until said heat treatment at final finishing so that the water-retention property of said raw meat or fish is not degraded due to the higher pH value prior to final finishing and increased preservability is achieved by lowering of the pH of the meat or fish product by release of sorbic acid through heat treatment at final finishing.

2. The method of claim 1 wherein the hardened oil is hardened beef tallow.

3. The method of claim 1 wherein the hardened oil is hardened rape oil.

4. The method of claim 1 wherein the hardened oil is hardened whale oil.

5. The method of claim 1 wherein the hardened oil is hardened castor oil.

6. A method of preserving meat or fish products which are subjected to a heat treatment in the final finishing step and which have their water-retention property degraded and preservability enhanced by lowering the pH of the meat or fish product, which method comprises adding to the raw meat or fish product during the production thereof a preservative comprising particles of sorbic acid powder, the surfaces of which are coated with a hardened oil having a melting temperature of 40°–90° C., said preservative being prepared by melting said hardened oil, adding to said melted hardened oil maintained at a temperature not exceeding 90° C., sorbic acid powder in an amount of 1/10 to ½ of the weight of said hardened oil, dispersing said sorbic acid powder uniformly in the melted hardened oil at said temperature, and thereafter cooling the melted mixture by spraying the same, whereby the sorbic acid is not released in the meat or fish product until said heat treatment at final finishing so that the water-retention property of said raw meat or fish is not degraded due to the higher pH value prior to final finishing and increased preservability is achieved by lowering of the pH of the meat or fish product by release of sorbic acid through heat treatment at final finishing.

7. The method of claim 6 wherein the hardened oil is hardened beef tallow.

8. The method of claim 6 wherein the hardened oil is hardened rape oil.

9. The method of claim 6 wherein the hardened oil is hardened whale oil.

10. The method of claim 6 wherein the hardened oil is hardened caster oil.

11. The method of claim 6 wherein the meat product is meat sausage.

12. The method of claim 6 wherein the fish product is fish sausage.

* * * * *